(12) United States Patent
Werner et al.

(10) Patent No.: US 10,423,475 B2
(45) Date of Patent: Sep. 24, 2019

(54) STATEFUL TOKENS FOR COMMUNICATING WITH EXTERNAL SERVICES

(71) Applicant: Microsoft Technology Licensing, LLC, Redmond, WA (US)

(72) Inventors: Kyle Anthony Werner, Seattle, WA (US); Mark David Overholt, Bellevue, WA (US); Samuel Lenz Banina, Bellevue, WA (US); Jose Miguel Arreola Gutierrez, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 15/283,154

(22) Filed: Sep. 30, 2016

(65) Prior Publication Data
US 2018/0095813 A1   Apr. 5, 2018

(51) Int. Cl.
   *G06F 11/07*   (2006.01)
   *H04L 29/08*   (2006.01)
   *H04L 12/26*   (2006.01)

(52) U.S. Cl.
   CPC ...... *G06F 11/0709* (2013.01); *G06F 11/0793* (2013.01); *H04L 43/0817* (2013.01); *H04L 67/22* (2013.01)

(58) Field of Classification Search
   CPC .................... G06F 11/0709; G06F 11/0793
   See application file for complete search history.

(56) References Cited

U.S. PATENT DOCUMENTS

| 5,586,118 A * | 12/1996 | Hashimoto ......... B60R 16/0315 370/451 |
| 6,317,879 B1 * | 11/2001 | Jacobson, Jr. ........ G06F 9/4416 714/E11.179 |
| 6,651,183 B1 * | 11/2003 | Gensler, Jr. ......... G06F 11/0709 714/4.3 |

(Continued)

FOREIGN PATENT DOCUMENTS

EP   2761486 A1   8/2014

OTHER PUBLICATIONS

International Search Report and the Written Opinion cited in PCT Application No. PCT/US2017/053143, dated Nov. 30, 2017.

(Continued)

*Primary Examiner* — Yolanda L Wilson
(74) *Attorney, Agent, or Firm* — Workman Nydegger

(57) ABSTRACT

Generating a token for tracking a state of communications with multiple external services. Data is caused to be acquired from external services as a result of interpreting a communication from a client. The causing of the data to be acquired comprises causing a request to be issued for data from a first external service and receiving a response from the first external service. The response from the first external service includes at least a token associated with the first external service. In response to receiving the response from the first external service, an aggregate token is generated that includes the token associated with the first external service and a status of the request to the first external service. The aggregate token is caused to be sent to the client and is interpretable to inform the computer system of the status of the request to the first external service.

21 Claims, 4 Drawing Sheets

(56) References Cited

U.S. PATENT DOCUMENTS

| | | | |
|---|---|---|---|
| 6,801,949 B1* | 10/2004 | Bruck | H04L 29/12009 709/232 |
| 7,953,861 B2 | 5/2011 | Yardley | |
| 8,140,697 B2 | 3/2012 | Allen et al. | |
| 8,260,940 B1 | 9/2012 | Vosshall et al. | |
| 8,711,396 B2 | 4/2014 | Tian | |
| 8,968,077 B2 | 3/2015 | Weber et al. | |
| 9,391,825 B1 | 7/2016 | Beal et al. | |
| 2002/0024931 A1* | 2/2002 | Chikazawa | H04L 1/22 370/228 |
| 2002/0051541 A1 | 5/2002 | Glick et al. | |
| 2003/0041178 A1* | 2/2003 | Brouk | G06F 9/465 719/313 |
| 2003/0182592 A1* | 9/2003 | Massa | G06F 11/0727 714/5.11 |
| 2007/0203712 A1 | 8/2007 | Sunday et al. | |
| 2008/0247320 A1* | 10/2008 | Grah | H04L 41/5012 370/241 |
| 2009/0222815 A1* | 9/2009 | Dake | G06F 9/455 718/1 |
| 2009/0300403 A1 | 12/2009 | Little | |
| 2012/0026929 A1 | 2/2012 | Wang et al. | |
| 2012/0210415 A1* | 8/2012 | Somani | H04L 63/0884 726/9 |
| 2013/0066952 A1 | 3/2013 | Colrain et al. | |
| 2013/0159767 A1* | 6/2013 | Camelon | G06F 11/0709 714/15 |
| 2013/0346249 A1 | 12/2013 | Li | |
| 2014/0188586 A1 | 7/2014 | Carpenter et al. | |
| 2014/0207927 A1 | 7/2014 | Fichtenholtz et al. | |
| 2015/0149629 A1 | 5/2015 | Zhang et al. | |
| 2016/0034210 A1* | 2/2016 | Gentile | G06F 11/2087 714/6.23 |
| 2016/0224426 A1* | 8/2016 | Holden | G06F 11/1433 |
| 2016/0234198 A1 | 8/2016 | Breiman et al. | |
| 2018/0097882 A1* | 4/2018 | Mu | H04L 67/1097 |

OTHER PUBLICATIONS

"Sending Freight Requests to the Third-Party Freight System", https://docs.oracle.com/cd/E39583_01/fscm92pbr0/eng/fscm/scin/task_SendingFreightRequeststotheThird-PartyFreightSystem-1b78f6.html, Retrieved Date: Sep. 26, 2016, 2 pages.

* cited by examiner

400

410
Causing Data To Be Acquired From One Or More External Services As A Result Of Interpreting A Communication From A Client, Wherein The Causing Of The Data To Be Acquired From The One Or More External Services Comprises Causing A Request To Be Issued For Data From The First External Service Of The One Or More External Services And Receiving A Response From The First External Service

420
In Response To Receiving The Response From The First External Service, Generating An Aggregate Token That Includes The Token Associated With The First External Service And A Status Of The Request To The First External Service That Is Based On The At Least The Portion Of Data

430
Causing The Aggregate Token To Be Sent To The Client Along With A Continuation Link That Is Interpretable By The Computer System To Inform The Computer System Of The Status Of The Request To The First External Service

*Figure 4*

STATEFUL TOKENS FOR COMMUNICATING WITH EXTERNAL SERVICES

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computer tasks is distributed across a number of different computer systems, a number of different computer environments, and/or a number of different computer services.

For example, a particular computer system or software program may rely on multiple external/third party services in order to provide the computer system's/software program's desired functionality. Oftentimes such external services each have very different application programming interfaces (API's). These different API's may result in differences in the protocols used to perform requests to each service, as well as differences in the type of data that is received in response to a request. As such, when a computer system depends on a number of external services, it is important to properly manage outgoing and incoming interactions with those services in a way that allows the computer system to fully utilize the data received from those external services. Furthermore, each request to an external service may have the potential to cause a failure or disrupt a request to a different external service.

BRIEF SUMMARY

At least some embodiments described herein relate to generating a token for tracking a state of communications with multiple external services. For example, embodiments may include causing data to be acquired from one or more external services as a result of interpreting a communication from a client. The causing of the data to be acquired from the one or more external services comprises causing a request to be issued for data from a first external service of the one or more external services and receiving a response from the first external service. The response from the first external service includes at least a portion of data and a token that is associated with the first external service.

In response to receiving the response from the first external service, an aggregate token is generated that includes the token associated with the first external service and a status of the request to the first external service that is based on the at least the portion of data. The aggregate token is then caused to be sent to the client along with a continuation link that is interpretable by the computer system to inform the computer system of the status of the request to the first external service.

Accordingly, a resource provider may generate an aggregate token that allows a client computer system to communicate with multiple external services concurrently. More specifically, the aggregate token may allow for tracking page locations of multiple concurrent requests to external services such that failed/interrupted requests may be easily resumed. Furthermore, such tracking of state by the generated aggregate token may allow the resource provider to be stateless such that there is no need for tracking the operations of the resource provider in storage/memory. As such, communicating with external services in this way (i.e., utilizing a resource provider and a generated aggregate token) may be resilient to failure/error, while minimizing the storage/memory to be used in tracking page locations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a flow chart of an example method for generating a token for tracking a state of communications with multiple external services.

DETAILED DESCRIPTION

At least some embodiments described herein relate to generating a token for tracking a state of communications with multiple external services. For example, embodiments may include causing data to be acquired from one or more external services as a result of interpreting a communication from a client. The causing of the data to be acquired from a first external service of the one or more external services comprises causing a request to be issued for data from the first external service of the one or more external services and receiving a response from the first external service. The response from the first external service includes at least a portion of data and a token that is associated with the first external service.

In response to receiving the response from the first external service, an aggregate token is generated that includes the token associated with the first external service and a status of the request to the first external service that is based on the at least the portion of data. The aggregate token is then caused to be sent to the client along with a continuation link that is interpretable by the computer system to inform the computer system of the status of the request to the first external service.

Accordingly, a resource provider may generate an aggregate token that allows a client computer system to communicate with multiple external services concurrently. More specifically, the aggregate token may allow for tracking page locations of multiple concurrent requests to external services such that failed/interrupted requests may be easily resumed. Furthermore, such tracking of state by the generated aggregate token may allow the resource provider to be stateless such that there is no need for tracking the operations of the resource provider in storage/memory. As such, communicating with external services in this way (i.e., utilizing a resource provider and a generated aggregate token) may be resilient to failure/error, while minimizing the storage/memory to be used in tracking page locations.

Some introductory discussion of a computing system will be described with respect to FIG. 1. Then generating a token for tracking a state of communications with multiple external services will be described with respect to FIGS. 2 through 4.

Figure 1:
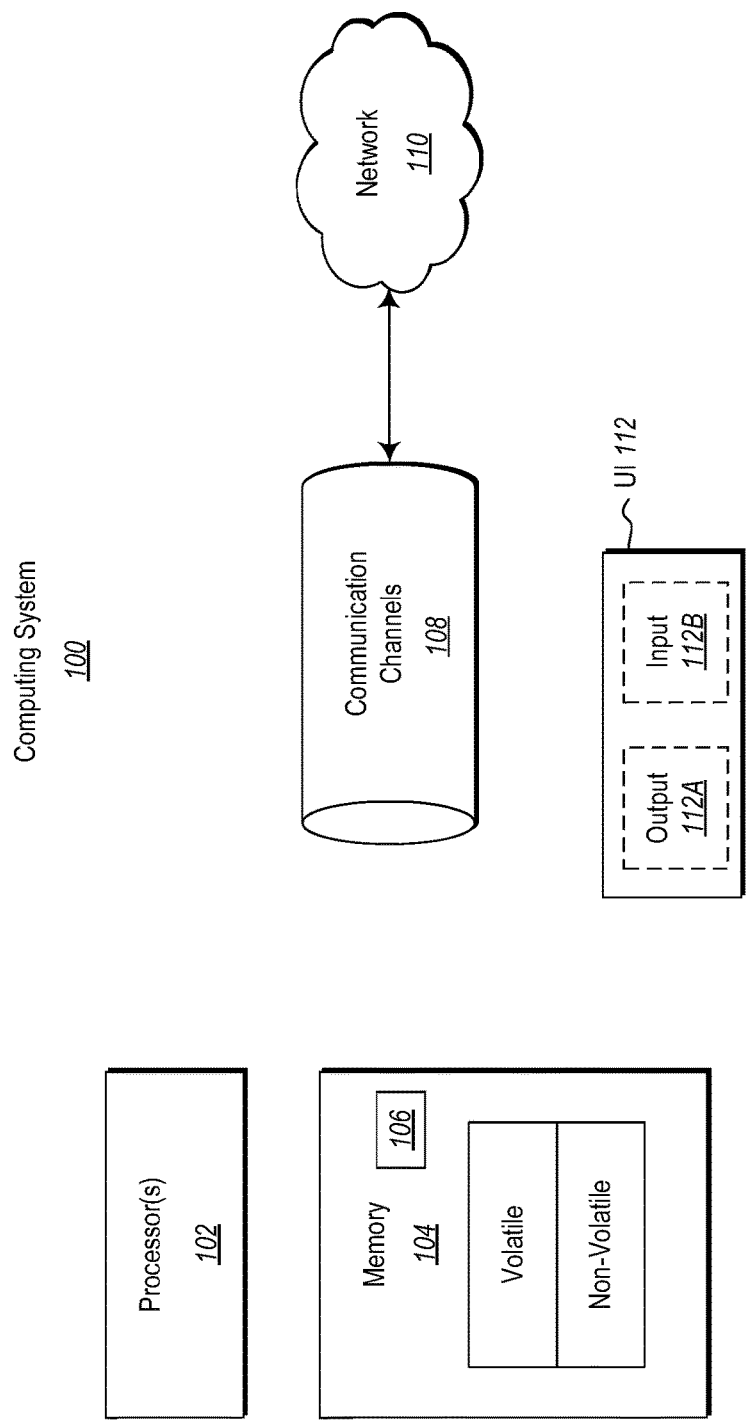
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", "resource provider" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
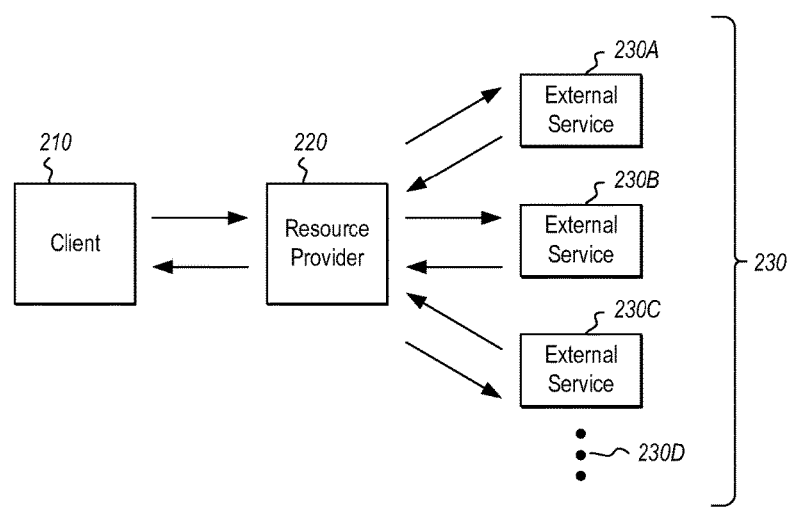
FIG. 2 illustrates an example environment for using a resource provider as intermediary for communications between a client and multiple external services.

FIG. 2 illustrates a computer environment 200 for practicing the principles described herein. FIG. 2 includes a client computer system 210 that may be any type of computer system, including a desktop, laptop, smart phone, tablet, smart watch, and so forth, whether now existing or whether to be developed in the future. For instance, computer system 210 may comprise computer system 100, as described with respect to FIG. 1. Additionally, client computer system 210 may run any type of operating system (OS). For example, the client computer system may run MICROSOFT® WINDOWS®, APPLE® OS X®, APPLE IOS, GOOGLE™ CHROME OS™, GOOGLE ANDROID™, LINUX®, and so forth, whether now existing or whether to be developed in the future. While client computer system 210 is described throughout as a physical computer system, client computer system 210 may also comprise a client software application, website, web page, web service, web application, and so forth.

FIG. 2 also includes resource provider 220 and external services 230A (also referred to as third party services herein) through 230C, collectively referred to herein as the external services 230. While only three external services 230 are shown, ellipses 230D represent that there may be any number of external services. Resource provider 220 may comprise any service that manages interactions between client computer system 210 and external services 230. External services 230 may comprise any type of service accessible to a computer system. For instance, external services 230 may comprise social media websites/applications (e.g., TWITTER®, FACEBOOK®, and so forth), cloud storage services (e.g., GOOGLE DRIVE™, DROPBOX®, and so forth), databases (e.g., SQL), subscription services (e.g., SALESFORCE®), and so forth.

Each of these external services 230 may have different application programming interfaces (API). Accordingly, protocols for paging/communicating may be different for each one of the external services 230, however, the resource provider may understand each of the different paging/communication protocols. The resource provider may then translate all of the data the resource provider receives from the external services in a unified manner (e.g., present the communications in a common page) for a client (e.g., client computer system 210). Accordingly, the resource provider may abstract away from a client all backend paging operations/communications that are performed between the resource provider 220 and the external services 230.

In an example that is used throughout, suppose an end user is using a web version of MICROSOFT POWERAPPS™ (POWERAPPS). The end user may be using a web version or mobile version of POWERAPPS to create apps and/or utilize created apps. The end user may be the creator of such an app(s) or may have simply been authorized by the creator to utilize the app(s). Such created apps may include connections to one or more external services 230. Accordingly, in this scenario POWERAPPS, or an app created in POWERAPPS, may comprise the client computer system 210 that desires to communicate with one or more external services.

For instance, a created app (i.e., client computer system 210) may have connections to two particular different types of databases (e.g., external service 230A and external service 230B) for the purposes of performing data queries within the databases and then displaying the results of the queries. These two particular types of databases may have completely different API's. As such, resource provider 220 may act as an intermediary capable of managing the different types of communications to be sent and received between the created app (i.e., client computer system 210) and external services 230A.

Two separate approaches for managing these communications (i.e., between client computer system 210 and external services 230) by the resource provider 220 are discussed herein. For example, in a first approach, resource provider 220 may receive an indication/request from client computer system 210 to call external service 230A. In doing so, resource provider 220 may call external service 230A in order to fill a first page of data for the client computer system 210. Upon fulfillment of the request, the external service 230A may return to the resource provider the first page of data alongside a token specific to the external service's service and data structure. Resource provider 220 may then translate the first page of data and the service-specific token to a format understood by client computer system 210. The resource provider may then reuse the token of external service 230A as part of the resource provider's own token.

When a subsequent request is made by client computer system 210 for the next page of data from external service 230A, the resource provider's own token may then be reused directly to call external service 230A for the rest of the data. Once again, data provided by external service 230A in response to the request may be translated by resource provider 220 into a format understood by the client computer system 210. The translated data may then be sent from the resource provider to the client computer system. The request may then be complete. If an error occurs on the initial request, or any subsequent requests, by the resource provider 220 to external service 230A, a relevant error may be returned to the client computer system, at which point the request may be terminated.

In a second, more complex approach, resource provider 220 may receive an indication/request from client computer system 210 to call multiple external services (e.g., external services 230A through 230C). In response, the resource provider may call external service 230A, external service 230B, and external service 230C in a particular order, only proceeding to call the next external service after the previous external service has fulfilled all of its requests from client computer system 210 or failed in attempting to do so.

Communicating with multiple dependent services in this way can expose challenging problems related to tracking the page locations of each concurrent request. Additionally, each outbound request from the resource provider may have the potential to fail and disrupt the operation of the requests/communications with other external sources. In order to solve these problems that are created by making subsequent calls to multiple external services in a pre-determined order, the resource provider may generate a complex, aggregate token. The aggregate token may include a number of different types of data.

For instance, each of the external services may have a unique identifier, as well as a token relating to communications specific to the particular external service. Those unique identifiers and the external service-specific tokens may be included within the aggregate token and may allow the client computer system 210 and/or the resource provider 220 to track multiple page locations independent of the other external services to be called. As such, the generated aggregate token may also track the last seen service-specific token. Additionally, as briefly discussed, including the service-specific tokens may allow the aggregate token to track the last known location. More specifically, the last known location may comprise a particular location from which a request is to begin, or resume. For example, if an external service has responded to a request with only a first page of data, the aggregate token may track the last known location such that the client computer system 210 and/or the resource provider 220 may know to resume the request at the second page, in the case of any interruption. Accordingly, subsequent calls made with the generated aggregate token may allow the client computer system 210 and/or the resource provider 220 to resume any outgoing external service call using the external service identifier, external service-specific tokens, the last known location, and the last seen service/entity.

Another component of the generated aggregate token may track an overall request success status. In some embodiments, such a success/failure tracker may comprise a Boolean value that simply identifies whether any failure has occurred during the process of communicating with external services (i.e., a true or false distinction). In such cases, there may not be any identification of the particular failure, just that a failure occurred. Furthermore, in the case of a failure from one of the calls being made in parallel to multiple external services, the other successful calls may be allowed to finish before an indication of partial failure is returned alongside the successful response. In other embodiments, an identification of the particular failure that occurred may be tracked and communicated to a client computer system, as described more fully herein.

The generated aggregate token may comprise any appropriate data structure. For instance, the generated aggregate token may comprise an encoded JSON object. In addition to solving the problems described, the generated aggregate token may have a number of other benefits. For instance, the resource provider 220 may act as an intermediary with respect to all of these communications from the client computer system 210 to the external services 230 while being stateless. Accordingly, there may be no tracking of the operations of the resource provider in storage/memory because the generated aggregate token tracks all of the state to be used in beginning and resuming these communications with external services. As such, performing these communications in such a way may be resilient to error or failure.

Figure 3:
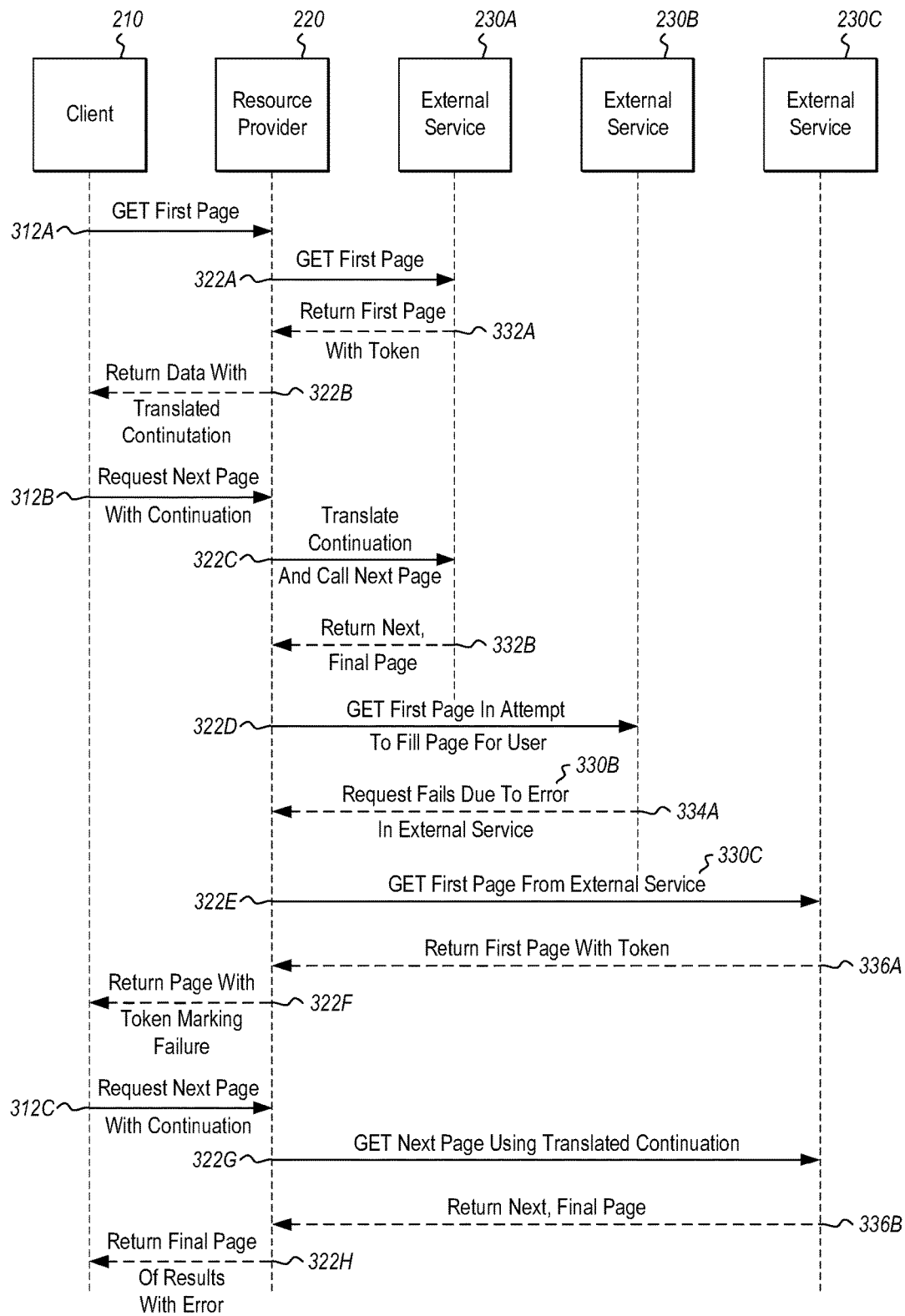
FIG. 3 illustrates an example scenario for calling to multiple services through a resource provider.

FIG. 3 illustrates an example scenario for calling to multiple services through a resource provider using a generated aggregate token. As shown, FIG. 3 includes a series of calls (i.e., requests/indications) made by client computer system 210 to resource provider 220, which results in calls to external service 230A, external service 230B, and external service 230C. The resulting outgoing calls from the resource provider 220 to the external services 230 may be orchestrated by the resource provider through the use of a complex aggregate token, as described in further detail herein.

At the beginning of the first request 312A by the client computer system 210, the resource provider 220 may have no known state and begin by determining which services the resource provider is to call. After determining that the resource provider is to call external service 230A, external service 230B, and external service 230C in that stated order, the resource provider may begin a request 322A to external service 230A for that service's first page of data. External service 230A may send a response 332A to the resource provider with the first page of data, as well as an encoded token that is specific to external service 230A.

The resource provider 220 may then translate the page of data and the encoded token such that the page of data and the encoded token are understandable to the computer system 210. The resource provider may then generate an aggregate token that includes the translated page of data and the encoded token that is specific to the external service 230A. The token may also include the last seen service (or service-specific token) and the last known location. The resource provider may also mark the new token with a Boolean value that indicates whether a failure occurred on the request to the external service 230A. As shown in FIG. 3, no failure occurred relating to the request to the external service 230A, so the Boolean value would indicate that no failure has occurred.

Finally, the aggregate token may be encoded by the resource provider to be sent to the client computer system 210 as part of a continuation link (or continuation token/next link) that the client computer system may call in order to complete the request to external service 230A. Accordingly, the resource provider 220 may then send response 322B that comprises a continuation link (or continuation token/next link) that includes the generated aggregate token, to the client computer system 210. The client computer system 210 may then make a subsequent request 312B using the continuation link provided by the resource provider. The generated aggregate token included in the continuation link from the client computer system's request may inform the resource provider of the manner in which to call external service 230A for the next page(s) of data. Accordingly, the resource provider may interpret the continuation link to determine the status of the current request.

Once informed, the resource provider may call external service 230A by sending request 322C to complete the request for data based on the continuation link. In response, external service 230A may complete the request and send a response 332B to the resource provider that includes a partial page and no service-specific token. The resource provider may then attempt to finish filling the page for the client computer system, which may alert the resource provider that more requests to external services are to be performed. As such, the resource provider may then begin a request 322D for the first page of data from external service 230B. As shown in the scenario illustrated in FIG. 3, external service 230B may have a failure 334A to respond to the request. At that time, the resource provider may mark the Boolean value of the generated aggregate token with a value indicating that a failure occurred.

The resource provider may then again attempt to finish filling the page for the client computer system, which may alert the resource provider that more requests to external services are to be performed. As such, the resource provider may then begin a request 322E for the first page of data from external service 230C. In response, external service 230C may return a response 336A to the resource provider that includes the first page of data specific to external service 230C along with a token specific to the external service 230C. Similar to previous actions of the resource provider, the resource provider may include within the aggregate token the last seen service (i.e., external service 230C), a translated version of the encoded token from external service 230C, the last known location (i.e., the first page of data from external service 230C) and the Boolean value indicating a failure (i.e., the failed request to external service 230B).

Again, the aggregate token may be encoded by the resource provider and returned to the client computer system as part of the continuation link 322F that the client computer system may call in order to complete the request to the external service 230C. The client computer system may then make a subsequent request 312C, resulting in one more request 322G by the resource provider to external service 230C. In response to the request 322G, the external service 230C may return to the resource provider a final page 336B without any service-specific token. At which point, the resource provider may construct a final page 322H for the client computer system that includes a Boolean value indicating a partial failure during a portion of the entire paging session (i.e., the entire paging session includes paging all three of the external services 230 and the request to external service 230B failed).

With respect to FIG. 3, only the existence of an error is exposed to the end user. In other words, if an error/failure occurs with respect to one external service while one or more other external services are successful, the client computer system 210 may simply receive an indication there was a partial failure. However, it may also be possible to track, within the generated aggregate token, the exact errors/failures that have occurred rather than the Boolean value that simply tracks whether a failure occurred (i.e., yes or no indication). Upon completion of a final request to an external service, the resource provider 220 may look up the specific error message(s) and include the specific error message(s) in any response to the client computer system, as appropriate. In response, the client computer system may then use recovery logic to determine a recovery process to implement with respect to the specific error message(s) encountered, if appropriate.

FIG. 4 illustrates a flow chart of an example method 400 for generating a token for tracking a state of communications with multiple external services. Method 400 will be described with respect to the components and data of computer architecture 100, as well as environment 200. Method 400 includes causing data to be acquired from one or more external services as a result of interpreting a communication from a client, wherein the causing of the data to be acquired from the one or more external services comprises causing a request to be issued for data from the first external service of the one or more external services and receiving a response from the first external service (Act 410). In the ongoing example, a created app may be connected to multiple external services, including a social media application and a database. As such, the app (client computer system 210) may indicate to the resource provider 220 that the app would like a request for data to be made to the social media application. The resource provider may then make the request to the social media app. The social media app may then generate a response that includes at least a portion of data (e.g., a first page of data) and a token that is associated with the social media app. The token specific to the social media app may inform the resource provider and/or the app of how to perform further communications with the social media app, as well as the current state of the request (i.e., the last known location).

In response to receiving the response from the social media app, the resource provider may generate an aggregate token that includes the token associated with the first external service (i.e., the social media app) and a status of the request to the first external service that is based on the at least the portion of data (Act 420). For example, the generated token may include the last known location (i.e., the first page of data) and the token specific to the social media app, which may allow the resource provider and/or the client computer system to resume the request in the case of any failure.

The method 400 further includes causing the aggregate token to be sent to the client along with a continuation link that is interpretable by the computer system to inform the computer system of the status of the request to the first external service (Act 430). In the ongoing example, a continuation link that includes the generated aggregate token may be sent to the app. The app may then use the continuation link to indicate to the resource provider to call the social media app to complete the request for data.

In this way, a resource provider may generate an aggregate token that allows a client computer system to communicate with multiple external services concurrently. More specifically, the aggregate token may allow for tracking page locations of multiple concurrent requests to external services such that failed/interrupted requests may be easily resumed. Furthermore, such tracking of state by the generated aggregate token may allow the resource provider to be stateless such that there is no need for tracking the operations of the resource provider in storage/memory. As such, communicating with external services in this way (i.e., utilizing a resource provider and a generated aggregate token) may be resilient to failure/error, while minimizing the storage/memory to be used in tracking page locations.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
   one or more processors; and
   one or more computer-readable storage media having stored thereon computer-executable instructions that are executable by the one or more processors to cause the computer system to generate an aggregate token for tracking a state of communications with multiple external services by causing the computer system to:
   as a result of interpreting a communication from a client, cause data to be acquired from one or more external services, the causing of the data to be acquired from the one or more external services comprising:
      causing a request to be issued for data from a first external service of the one or more external services; and
      receiving a response from the first external service, the response from the first external service including at least a portion of data and a token that is associated with the first external service;
   in response to receiving the response from the first external service, generate the aggregate token, wherein the aggregate token includes the token associated with the first external service and a status of the request to the first external service that is based on the at least the portion of data such that the token associated with the first external service is reused and becomes a part of the aggregate token; and
   cause the aggregate token to be sent to the client along with a continuation link that is interpretable by the computer system to inform the computer system of the status of the request to the first external service.

2. The computer system in accordance with claim 1, wherein the aggregate token also includes a failure tracker that tracks when a failure has occurred.

3. The computer system in accordance with claim 2, wherein the failure tracker comprises a Boolean variable that identifies when a failure has occurred in a true or false manner.

4. The computer system in accordance with claim 2, wherein the failure tracker tracks particular failures that occur, such that the aggregate token is capable of informing the client of particular failures that have occurred.

5. The computer system in accordance with claim 4, wherein the client applies recovery logic to recover from any particular failures that have occurred, in response to receiving the aggregate token.

6. The computer system in accordance with claim 1, wherein, in response to receiving from the client the continuation link and the aggregate token, at least the following is performed:
   interpret the continuation link to determine the status of the request to the first external service; and
   cause a request to complete the request for data to be issued to the first external service based on the interpreted status.

7. The computer system in accordance with claim 6, wherein a response is received from the first external service, the response completing the request for data to the first external service.

8. The computer system in accordance with claim 7, wherein, in response to receiving the response completing the request to the first external service, at least the following is performed when data is caused to be acquired from at least a second external service:
   attempt to complete a final response to send to the client; and
   in response to attempting to complete the final response, determine that there is at least one more external service at which to make a request.

9. The computer system of claim 1, wherein a resource provider generates the aggregate token, the resource provided being stateless such that the resource provider refrains from tracking its own operations, including an operational state of the request, and
   wherein, as a result of the resource provider being stateless, the aggregated token is used to track the operational state of the request.

10. A method, implemented at a computer system that includes one or more processors, for generating an aggregate token for tracking a state of communications with multiple external services, the method including:
    as a result of interpreting a communication from a client, causing data to be acquired from one or more external services, the causing of the data to be acquired from the one or more external services comprising:
       causing a request to be issued for data from a first external service of the one or more external services; and
       receiving a response from the first external service, the response from the first external service including at least a portion of data and a token that is associated with the first external service;
    in response to receiving the response from the first external service, generating the aggregate token, wherein the aggregate token includes the token associated with the first external service and a status of the request to the first external service that is based on the at least the portion of data such that the token associated with the first external service is reused and becomes a part of the aggregate token; and causing the aggregate token to be sent to the client along with a continuation link that is interpretable by the computer system to inform the computer system of the status of the request to the first external service.

11. The method in accordance with claim 10, wherein the aggregate token also includes a failure tracker that tracks when a failure has occurred.

12. The method in accordance with claim 11, wherein the failure tracker comprises a Boolean variable that identifies when a failure has occurred in a true or false manner.

13. The method in accordance with claim 11, wherein failure tracker tracks particular failures that occur, such that the aggregate token is capable of informing the client of particular failures that have occurred.

14. The method in accordance with claim 13, wherein the client applies recovery logic to recover from any particular failures that have occurred, in response to receiving the aggregate token.

15. The method in accordance with claim 10, further comprising:

in response to receiving from the client the continuation link and the aggregate token, performing at least the following:

interpreting the continuation link to determine the status of the request to the first external service; and causing a request to complete the request for data to be issued to the first external service based on the interpreted status.

16. The method in accordance with claim 15, further comprising receiving a response from the first external service, the response completing the request for data to the first external service.

17. The method in accordance with claim 16, further comprising:

in response to receiving the response completing the request to the first external service, at least the following is performed when data is caused to be acquired from at least a second external service:

attempt to complete a final response to send to the client; and in response to attempting to complete the final response, determine that there is at least one more external service at which to make a request.

18. One or more hardware storage devices having stored thereon computer-executable instructions that are executable by one or more processors of a computer system to generate an aggregate token for tracking a state of communications with multiple external services by causing the computer system to:

as a result of interpreting a communication from a client, cause data to be acquired from one or more external services, the causing of the data to be acquired from the one or more external services comprising:

causing a request to be issued for data from a first external service of the one or more external services; and receiving a response from the first external service, the response from the first external service including at least a portion of data and a token that is associated with the first external service;

in response to receiving the response from the first external service, generate the aggregate token, wherein the aggregate token includes the token associated with the first external service and a status of the request to the first external service that is based on the at least the portion of data such that the token associated with the first external service is reused and becomes a part of the aggregate token; and cause the aggregate token to be sent to the client along with a continuation link that is interpretable by the computer system to inform the computer system of the status of the request to the first external service.

19. The one or more hardware storage devices of claim 18, wherein the aggregate token also includes a failure tracker that tracks when a failure has occurred.

20. The one or more hardware storage devices of claim 19, wherein the failure tracker comprises a Boolean variable that identifies when a failure has occurred in a true or false manner.

21. The one or more hardware storage devices of claim 19, wherein the failure tracker tracks particular failures that occur, such that the aggregate token is capable of informing the client of particular failures that have occurred.

* * * * *